(12) United States Patent
Jüngling et al.

(10) Patent No.: US 11,685,239 B2
(45) Date of Patent: Jun. 27, 2023

(54) GUIDE ASSEMBLY FOR AN OPEN-ROOF SYSTEM AND A METHOD FOR MAINTENANCE OF THE GUIDE ASSEMBLY

(71) Applicant: Inalfa Roof Systems Group B.V., Oostrum (NL)

(72) Inventors: Rainer Gerhard Jüngling, Mönchengladbach (DE); Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/025,700

(22) Filed: Sep. 18, 2020

(65) Prior Publication Data

US 2021/0086594 A1    Mar. 25, 2021

(30) Foreign Application Priority Data

Sep. 19, 2019 (EP) .................................. 19198411

(51) Int. Cl.
    *B60J 7/02*           (2006.01)
    *B60J 7/043*         (2006.01)
    *B60J 7/057*         (2006.01)

(52) U.S. Cl.
    CPC ............. *B60J 7/024* (2013.01); *B60J 7/0435* (2013.01); *B60J 7/0573* (2013.01)

(58) Field of Classification Search
    CPC ....... B60J 7/00; B60J 7/19; B60J 7/024; B60J 7/057; B60J 7/0435; B60J 7/0573; B60J 7/1856

(Continued)

(56) References Cited

U.S. PATENT DOCUMENTS 4,877,283 A     10/1989    Huyer
4,877,285 A * 10/1989    Huyer .................... B60J 7/0435
                                                           296/216.03

(Continued)

FOREIGN PATENT DOCUMENTS

CN            110435403 A     11/2019
DE             4238945 C1 * 11/1993 ............ B60J 7/0435

(Continued)

OTHER PUBLICATIONS

Faerber, "Slider Unit For Supporting Cover of Vehicle Roof, Has Rotating Sliders Arranged at Distance From Each Other and Attached to Curved Path of Bar Guide in Its Rotating Position, Where Sliders Are Arranged in Cage Manufactured From Plastic", Sep. 17, 2009, DE-102008017526-B3. (Year: 2009).*

(Continued)

*Primary Examiner* — Dennis H Pedder
*Assistant Examiner* — Joyce Eileen Hill
(74) *Attorney, Agent, or Firm* — Steven M. Koehler; Westman, Champlin & Koehler, P.A.

(57) ABSTRACT

In a guide assembly for an open-roof system of a vehicle, a closure member selectively covers or at least partly uncovers an opening in a vehicle roof. The assembly comprises a guide extending in a longitudinal direction of the vehicle; a mounting element for mounting the closure member; a first support mechanism operatively coupled to the mounting element, the first support mechanism slidably supporting the mounting element in the guide; and a second support mechanism coupled to the guide and comprising a support element slidably supporting the mounting element, the second support mechanism being configured for moving the mounting element to a tilted position, a tilt direction being substantially perpendicular to the longitudinal direction. The assembly is provided with a release mechanism for releasing the (Continued)

mounting element from at least one of the first support mechanism and the second support mechanism and for remounting the mounting element.

20 Claims, 9 Drawing Sheets

(58) Field of Classification Search
USPC .............................. 296/216.01–216.05, 224
See application file for complete search history.

(56) References Cited

U.S. PATENT DOCUMENTS

| | | | |
|---|---|---|---|
| 4,911,497 | A | 3/1990 | Schreiter |
| 5,746,475 | A | 5/1998 | Caye |
| 5,765,908 | A | 6/1998 | Kelm |
| 5,971,473 | A | 10/1999 | Kelm |
| 6,012,768 | A | 1/2000 | Nabuurs |
| 6,129,413 | A | 10/2000 | Klein |
| 6,199,944 | B1 | 3/2001 | Lee |
| 6,390,545 | B1 | 5/2002 | Makino |
| 6,454,347 | B2 | 9/2002 | Lee |
| 6,527,337 | B2 | 3/2003 | Farber |
| 7,850,231 | B2 | 12/2010 | Ito |
| 8,136,872 | B2 | 3/2012 | Nellen |
| 8,870,276 | B2 | 10/2014 | Geurts |
| 2005/0218704 | A1 | 10/2005 | Uehara |
| 2008/0191519 | A1 | 8/2008 | Sawada et al. |
| 2009/0039682 | A1 | 2/2009 | Ito |
| 2009/0072589 | A1 | 3/2009 | Ito |
| 2011/0285181 | A1* | 11/2011 | Manders .................. B60J 7/024 296/223 |
| 2013/0099528 | A1 | 4/2013 | Grimm et al. |
| 2013/0161983 | A1* | 6/2013 | Geurts .................... B60J 7/185 296/224 |
| 2019/0337368 | A1 | 11/2019 | Jungling et al. |

FOREIGN PATENT DOCUMENTS

| | | | | |
|---|---|---|---|---|
| DE | 4238945 | C1 | 11/1993 | |
| DE | 19851366 | | 5/1999 | |
| DE | 102008017526 | B3 * | 9/2009 | ............ B60J 7/0435 |
| DE | 102008017526 | B3 | 9/2009 | |
| DE | 102011015833 | A1 * | 10/2012 | ............... B60J 7/19 |
| DE | 102011015833 | A1 | 10/2012 | |
| DE | 102011018151 | A1 | 10/2012 | |
| DE | 102016125923 | A1 | 7/2018 | |
| DE | 202018102477 | U1 | 8/2019 | |
| EP | 0331910 | | 9/1989 | |
| EP | 1741588 | A1 | 1/2007 | |
| EP | 2028031 | | 2/2009 | |
| EP | 2607125 | A1 | 6/2013 | |
| EP | 3564054 | A2 | 11/2019 | |
| EP | 3564054 | A3 | 11/2019 | |
| FR | 2970439 | A1 * | 7/2012 | ............. B60J 7/024 |
| JP | 59156820 | | 9/1984 | |
| JP | 2697875 | | 5/1990 | |
| JP | 5204828 | B2 | 6/2013 | |
| WO | 2009109219 | | 9/2009 | |

OTHER PUBLICATIONS

Schrader et al., "Sliding Roof System, Particularly for Motor Vehicles, Has Guide Rail, Carriage Displaceable in Guide Rail and Front Lying Guide Element That Cooperates With Cover of Sliding Roof", Oct. 4, 2012, DE-102011015833-A1. (Year: 2012).*
Schaetzler et al., "Lifting and Sliding Car-roof—Uncouples Lifting Lever on Moving From Ventilating to Open Position and Engages With Guide Rail on Top of Fixed Roof", Nov. 25, 1993, DE-4238945-C1. (Year: 1993).*
Godet, "Horizontal sliding roof for motor vehicle", Jul. 20, 2012, French Patent Office, Edition: FR2970439A1 (Year: 2012).*
European Search Report and Written Opinion in corresponding European Patent Application No. 19198411.1, dated Mar. 17, 2020.
German Search Report and Written Opinion for German Patent Application No. 202018102477.9, dated May 3, 2018, with English translation.
Notice of Allowance issued in corresponding U.S. Appl. No. 16/401,432, dated Sep. 8, 2020.
European Office Action in corresponding European Patent Application No. 19198411.1 dated Nov. 3, 2022.

* cited by examiner

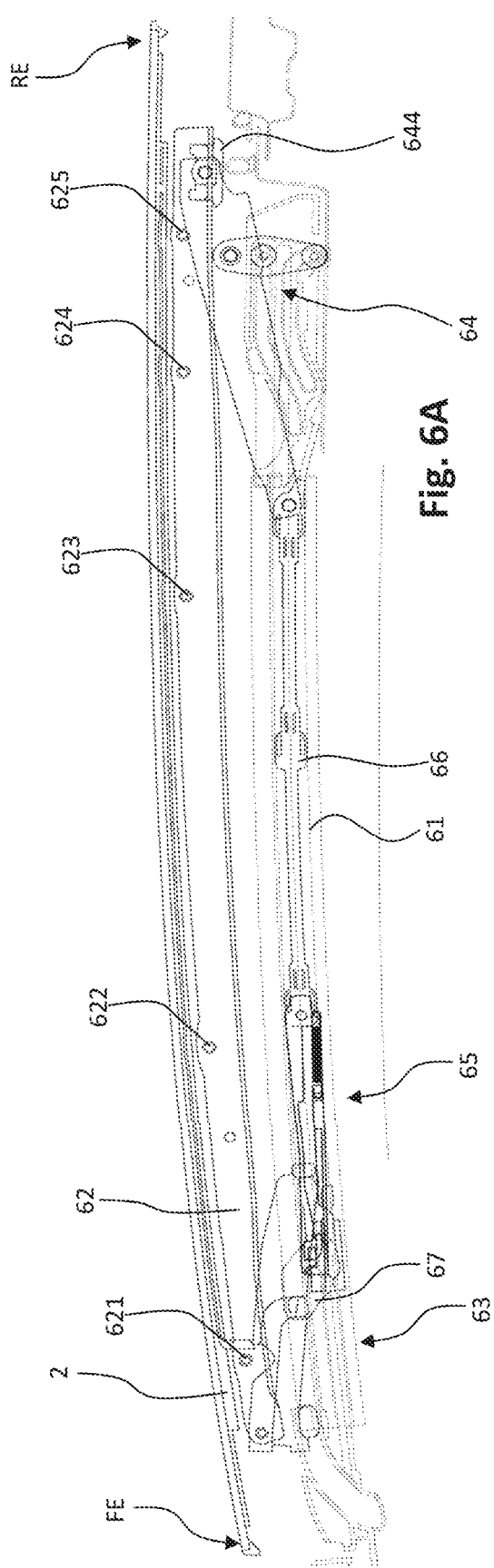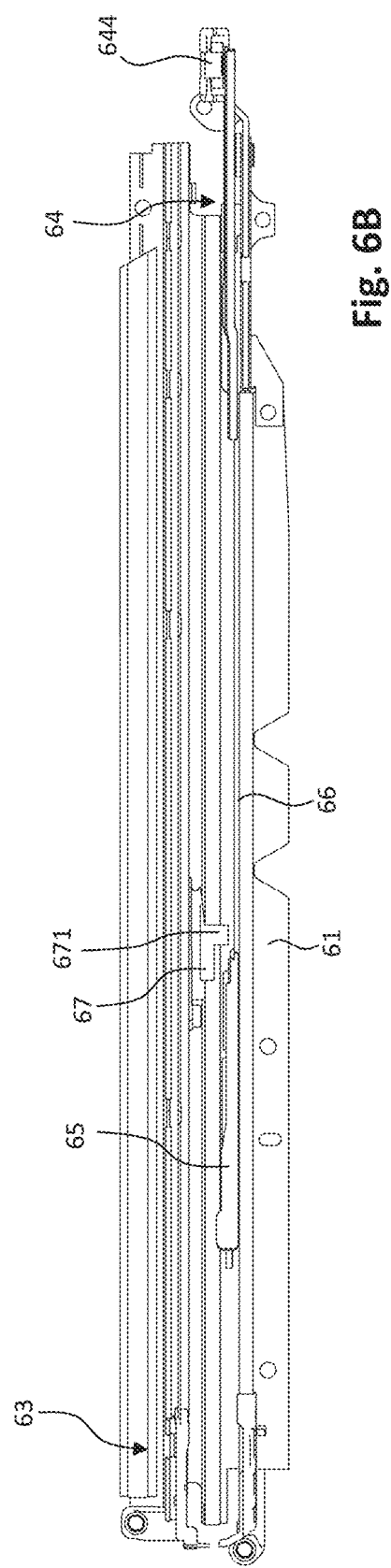

GUIDE ASSEMBLY FOR AN OPEN-ROOF SYSTEM AND A METHOD FOR MAINTENANCE OF THE GUIDE ASSEMBLY

BACKGROUND

The discussion below is merely provided for general background information and is not intended to be used as an aid in determining the scope of the claimed subject matter.

The invention relates to open-roof systems for a roof of a vehicle, in particular to a guide assembly for such an open-roof system, and to a method of performing maintenance on such a guide assembly.

Open-roof systems for vehicles are commonly known. A vehicle roof may be provided with an opening and the open-roof system provides a closure member, e.g. a glass panel. The closure member may be moveably arranged such that in a closed position the closure member covers the opening in the roof, while in an open position the opening is at least partly uncovered.

In the above-mentioned known open-roof assembly, a moveable closure member may be supported by a guide assembly. The guide assembly supports the closure member and provides for a suitable movement trajectory. In an exemplary known open-roof assembly, a rear end of the closure member is known to be first lifted out of a plane of the vehicle roof to a tilted position and then the closure member may be slide rearward, wherein a frontal end of the closure member may be lifted as well.

In a particular known guide assembly, the guide assembly comprises a guide, a first support mechanism and a second support mechanism. The guide extends in a longitudinal direction, which usually corresponds to a normal driving direction of the vehicle. The first support mechanism is slideably supported in the guide and the second support mechanism is arranged in the guide. The closure member is mounted to a mounting element. The mounting element is supported by the first support mechanism and is slideably supported by the second support mechanism.

The known guide assemblies are designed and configured to provide for functionality and manufacturability. Serviceability of the known open-roof assemblies is limited. As a result, in case of malfunctioning, it is known that the complete open-roof assembly is replaced by a new one, while simple maintenance or replacement of a single part could have repaired the open-roof assembly. Unnecessary replacement of the complete open-roof assembly results in unnecessary high costs, waste and annoyance.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A guide assembly is disclosed for a moveably arranged closure member of an open-roof system of a vehicle. The open-roof system has a closed position, in which a closure member covers an opening in a roof of the vehicle, and an open position, in which the opening is at least partly uncovered. The guide extends in a longitudinal direction of the vehicle and includes a mounting element for mounting the closure member; a first support mechanism operatively coupled to the mounting element, wherein the first support mechanism slidably supports the mounting element in the guide; and a second support mechanism coupled to the guide and comprising a support element slidably supporting the mounting element. The second support mechanism is configured for moving the mounting element in a tilt direction to a tilted position, the tilt direction being substantially perpendicular to the longitudinal direction. The guide assembly is provided with a release mechanism for releasing the mounting element from at least one of the first support mechanism and the second support mechanism and for remounting the mounting element.

In a prior art open-roof system the guide assembly is hardly accessible, due to which performing maintenance is difficult. To get access to the guide assembly, the closure member needs to be removed. In the prior art, such removal includes unmounting the closure member from the mounting element, which usually includes removing a number of screws that are arranged directly below the closure member. As these screws are not easily accessible, unmounting the closure member is cumbersome. Further, remounting of the closure member on the mounting element includes adjusting the position of the closure member relative to the roof of the vehicle, while ensuring smooth functioning of the guide assembly. In particular for inexperienced persons, such adjustment is time-consuming and it may proof to be difficult to achieve an optimal position of the closure member.

In the guide assembly disclosed herein, the accessibility is greatly improved by providing the release mechanism. Releasing the mounting element from at least one of the first support mechanism and the second support mechanism allows better access to the guide assembly as the closure member may be more easily moved to a position where it does not block access to the guide assembly. Further, by the release of the closure member, certain parts may be easily replaced by new parts. Then, after maintenance or repairs, the closure member may be remounted without a need to readjust the closure member position, since the position adjustment between the mounting element and the closure member has not been changed or released and thus has been maintained.

In an embodiment according to the present invention, the guide assembly further comprises a locking mechanism arranged in the guide and operatively coupled to the second support mechanism for operating the second support mechanism and locking the second support mechanism in the tilted position. The guide assembly is configured to operate the locking mechanism when moving the first support mechanism between the closed position and an intermediate position. In the intermediate position the opening is partly covered by the closure member. In this embodiment, the release mechanism is configured for rendering the locking mechanism temporarily inoperable for enabling to move the first support mechanism towards the closed position without operating the second support mechanism. As the locking mechanism is not operated, the second support mechanism is not operated and remains in the tilted position. Sliding the closure member towards the closed position results in slideably releasing the mounting element from the second support mechanism.

With the mounting element released from the second support mechanism, the closure member may be freely rotated upward, for example, enabling easy maintenance. For example, the second support mechanism may be easily cleaned or parts thereof may be repaired or replaced.

In a particular embodiment, the locking mechanism is decouplable from the second support mechanism. With the locking mechanism decoupled from the second support mechanism, the second support mechanism will remain in its tilted position, even when the first support mechanism is moved towards the closed position, even if the locking mechanism is operated during such movement. In an exemplary embodiment, the locking mechanism is detachably arranged in the guide and the locking mechanism is hingedly coupled to an elongated coupling element, the coupling element being couplable between the locking mechanism and the second support mechanism, and wherein the locking mechanism is decouplable after having been detached from the guide and having been rotated. In this exemplary embodiment, the locking mechanism is removable from the guide, rendering it temporarily inoperable. The removal process requires multiple steps. First, the locking mechanism is detached from the guide, thereby enabling a second step of a rotary movement. Such multiple step method prevents an accidental unlocking, e.g. during driving. Unlocking is only achievable by purposefully performing the multiple steps. Of course, any other suitable multiple step release methods may be employed.

In another exemplary embodiment, the guide assembly further comprises an operating slider slideably arranged in the guide. The operating slider comprises a locking cam for operating the locking mechanism, wherein the locking cam is displaceable from an operable position to an inoperable position. In the operable position, the locking cam is arranged for engaging an operating surface of the locking mechanism, when the slider is moved through the guide in the longitudinal direction and passed the locking mechanism, while in the inoperable position the locking cam is arranged for not engaging the operating surface of the locking mechanism. For example, the locking cam may be mounted on the operating slider with a releasable connection, e.g. a screw or snap connection. Unmounting the locking cam may enable the operating slider to move passed the locking mechanism without engaging and operating the locking mechanism.

In another embodiment of the guide assembly according to the present invention, the release mechanism is configured for releasing the first support mechanism from the guide. For example, in the closed position, the first support mechanism may be arranged at a frontal end of the guide. A blocking element may be provided at the frontal end for holding the first support mechanism. Then, the blocking element may be detachably arranged such that detaching the blocking element would allow the first support mechanism to be released from the guide.

In another exemplary embodiment, the first support mechanism comprises a slide shoe arranged in a guide channel of the guide and a release part of the guide is detachable for providing a release opening in the guide channel, the release opening being configured to allow release the slide shoe from the guide channel.

In an aspect, the present invention further provides a method for maintenance of a guide assembly for a moveably arranged closure member of an open-roof system of a vehicle, the open-roof system having a closed position, in which the closure member covers an opening in a roof of the vehicle, and an open position, in which the opening is at least partly uncovered, the guide assembly comprising a first support mechanism and a second support mechanism, both said mechanisms supporting a mounting element, the mounting element being configured for mounting the closure member. The method comprises moving the closure member to the open position; releasing the mounting element from at least one of the first support mechanism and the second support mechanism; and remounting the mounting element at said at least one of the first support mechanism and the second support mechanism. As the closure member is released with the mounting element, there is no need for position adjustment after remounting the closure member.

In an embodiment of the method, the guide assembly comprises a locking mechanism for locking the second support mechanism in a tilted position, the method comprises the steps of moving the closure member from the closed position to the open position at least to the extent that the second support mechanism is locked in the tilted position; rendering the locking mechanism temporarily inoperable; and moving the closure member towards the closed position, thereby releasing the mounting element from the second support mechanism. For example, the step of rendering the locking mechanism temporarily inoperable may comprise the steps of detaching the locking mechanism from the guide; rotating the locking mechanism; and decoupling the locking mechanism from the second support mechanism.

In another embodiment, the method comprises releasing the first support mechanism from the guide.

Of course, both the guide assembly and the method may include that the first support mechanism and the second support mechanism are both releasable from the mounting element, thereby enabling to easily temporarily remove the closure member such to enable maintenance on the guide assemblies or any other parts that would become accessible through the opening in the roof of the vehicle.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art.

BRIEF DESCRIPTION OF THE DRAWINGS

FIG. 6A illustrates a side view of a detailed embodiment of a guide assembly according to the first embodiment of the present invention;

FIG. 6B illustrates a top view of the embodiment of FIG. 6A;

DETAILED DESCRIPTION OF THE ILLUSTRATIVE EMBODIMENTS

Figure 1A:
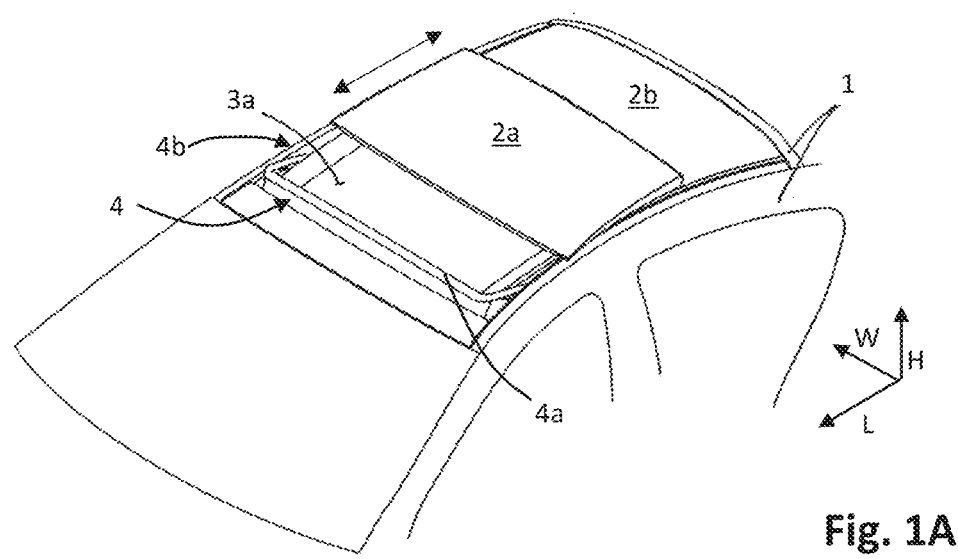
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1 illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end (RE) of the moveable panel 2a is raised (in a substantially vertical direction V) as compared to the closed position, while a front end (FE) of the moveable panel 2a is still in the closed position. Further, the moveable panel 2a may be in an open position, which is a position wherein the moveable panel 2a is slid open (slid in a longitudinal direction L) and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
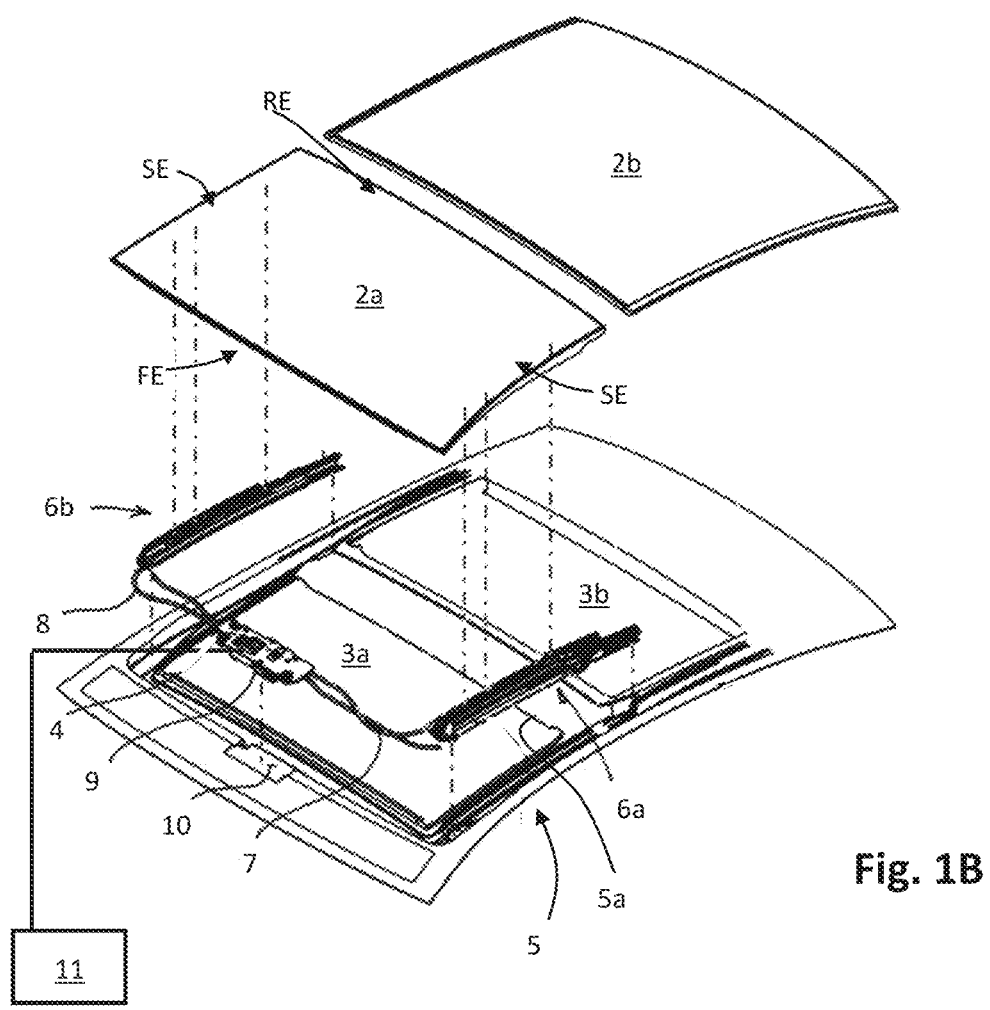
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts airflow when the moveable panel 2a is in the open position. In its raised position, the wind deflector 4 reduces inconvenient noise due to airflow during driving. When the moveable panel 2a is in the closed position or in the tilted position, the wind deflector 4 is held down below the front end (FE) of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b extend in the longitudinal direction L, are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a drive motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end (RE) of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end (RE), while an open position is reached by first lowering the rear end (RE) and then sliding the moveable panel 2a under the fixed panel 2b or any other structure or element provided behind the rear end (RE) of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end (FE) of the moveable panel 2a at a recess 10. In another embodiment, the drive motor 9 may be positioned at any other suitable position or location. For example, the drive motor 9 may be arranged near or below the rear end (RE) of the moveable panel 2*a* or below the fixed panel 2*b*.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

Figure 2A:
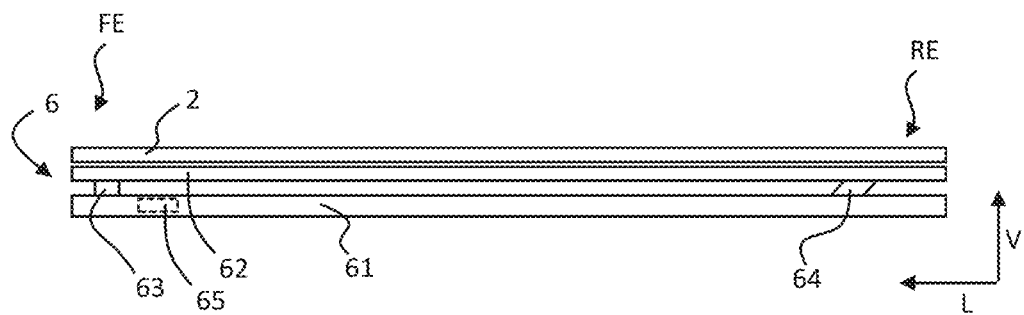
FIG. 2A-2D illustrate an opening operation of a prior art open-roof assembly.

FIG. 2A schematically illustrates a guide assembly 6 for use in an open-roof system as shown in FIGS. 1A an 1B. On the guide assembly 6, a closure member 2 is provided. The closure member 2 may be a glass panel or any other suitable panel as above described. The guide assembly 6 comprises a guide 61, which provides at least one guide channel for guiding one or more elements of a mechanism of the guide assembly 6. In the illustrated embodiment, the guide assembly 6 comprises a first support mechanism 63 and a second support mechanism 64. Both mechanisms 63, 64 are coupled to and support a mounting element 62. The guide assembly 6 further comprises a locking mechanism 65. The locking mechanism 65 is coupled to the second support mechanism 64 by an elongated coupling element (not shown), as known from the prior art. Upon moving the coupling element towards the second support mechanism 64, the second support mechanism 64 is operated, as illustrated in and described hereinbelow in relation to FIGS. 2B-2D.

The closure member 2 is attached to the mounting element 62. Upon operating the first support mechanism 63 and/or the second support mechanism 64, the mounting element 62 is moved along a predetermined trajectory. In the illustrated embodiment, the first support mechanism 63 and the second support mechanism 64 are each mechanically designed to provide for such predetermined trajectory. In another suitable embodiment, the trajectory may be provided in any other suitable manner. For example, using multiple motors, a control unit may be configured to control the multiple motors such that a predetermined trajectory is achieved.

In order to operate the first support mechanism 63 and the second support mechanism 64, in the illustrated embodiment, a drive cable may be connected between a motor and a sliding element, wherein the sliding element is arranged in the guide 61 and is arranged to slide through the guide 61 when the motor pulls or pushes the drive cable. Such a drive assembly is well known from the art and therefore not shown in detail herein. Moreover, the present invention is not limited in any way to such drive assembly. Any other drive assembly suitably achieving the operation of the first support mechanism 63 and the second support mechanism 64 may be employed as well within the scope of the present invention.

Figure 2B:
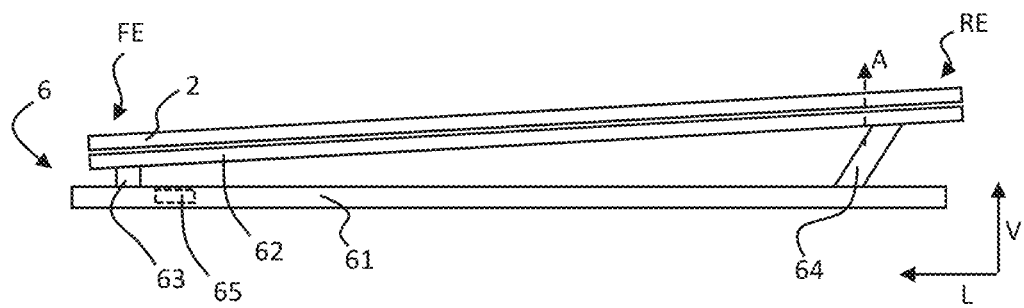

As may be apparent, in FIG. 2A, the closure member 2 is in the closed position. FIG. 2B illustrates a first stage of an opening process. In FIG. 2B, the locking mechanism 65 has moved towards the second support mechanism 64, thereby operating the second support mechanism 64. In this stage of the operation, the second support mechanism 64 has moved the mounting element 62 in direction A substantially parallel to the substantially vertical direction V, which is substantially perpendicular to the longitudinal direction L. In order to enable the movement of the rear end (RE), the front end (FE) may be moved by the first support mechanism 63, but this is not required.

It is noted that the use of the term 'vertical direction' should not be construed as limiting, but merely an indication of a direction perpendicular to the plane of the roof, which commonly has an orientation in a substantially horizontal plane. 'Vertical direction' is thus intended to refer to a direction substantially perpendicular to a plane in which the open-roof assembly is oriented, when in a closed position.

Figure 2C:
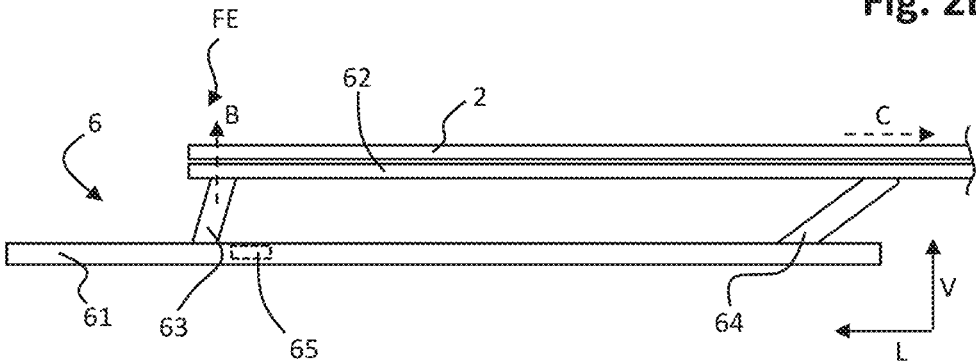

FIG. 2C shows a further stage of the opening process, wherein the locking mechanism 65 has moved further rearwards and has arrived at its end position, where it is locked in its position, as known in the art. With the locking mechanism 65 locked in its position, the second support mechanism 64 is locked in its position and orientation. Meanwhile, the first support mechanism 63 has lifted in direction B substantially parallel to the substantially vertical direction V and has moved rearwards in direction C which is substantially parallel to the longitudinal direction L. The mounting element 62 has moved with the first support mechanism 63 rearwards. The mounting element 62 is slidably supported by the second support mechanism 64 such that upon moving rearwards with the first support mechanism 63, the mounting element 62 slides along the second support mechanism 64.

Figure 2D:
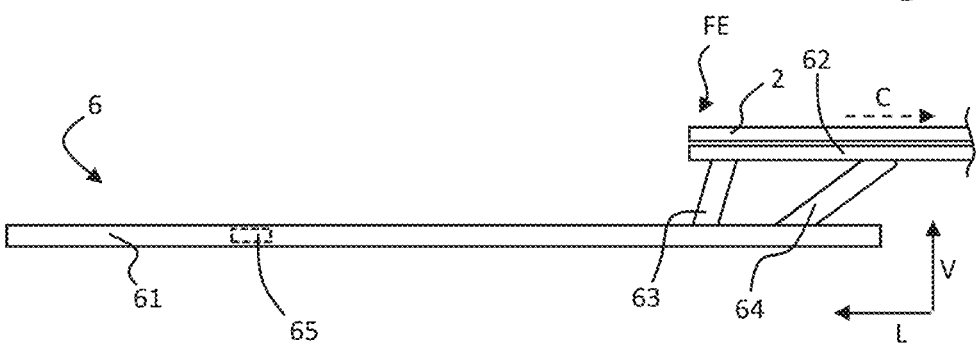

A fully open position of the closure member is shown in FIG. 2D. The first support mechanism 63 has moved further rearwards, thereby sliding the closure member 2 rearwards. The locking mechanism 65 has however remained in its locked position.

As apparent to those skilled in the art, a closing process follows the same stages as illustrated and described, but in the reverse order.

Maintenance operations on the guide assembly 6 are eased if the closure member 2 would be removed. However, in order to have the closure member in the closed position flush with the roof of the vehicle, the closure member 2 is mounted on the mounting element 62 using an attachment assembly wherein the position of the closure member 2 is adjustable. Any manufacturing tolerances may thus be compensated. Unmounting the closure member 2 would thus result in having to readjust the position thereof, when the closure member 2 is remounted. Adjusting the position is however a cumbersome process, requires experience and is time-consuming. To prevent the readjustment, the present invention provides for a guide assembly 6 and a method for maintenance, wherein the mounting element 62 may remain attached to the closure member 2, while the closure member 2 may be at least partially unmounted.

Figure 3A:
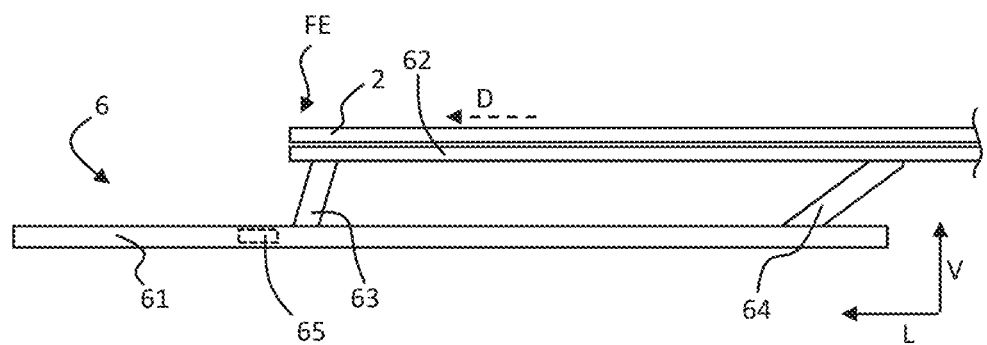
FIG. 3A-3E illustrate a first embodiment of a guide assembly and method according to the present invention.

FIGS. 3A-3D schematically illustrate a first embodiment, wherein at the rear end (RE) of the closure member 2, the mounting element 62 may be released from the slideable support at the second support mechanism 64. In FIG. 3A, a first stage of the first embodiment of the method according to the present invention is shown. The open-roof assembly has been opened to a stage, wherein the locking mechanism 65 is locked in its locked position (cf. FIG. 2C). In the locked position, the locking mechanism 65 may be rendered inoperable, meaning that the locking mechanism 65 will not be operated, when the drive assembly is operated.

Figure 3B:
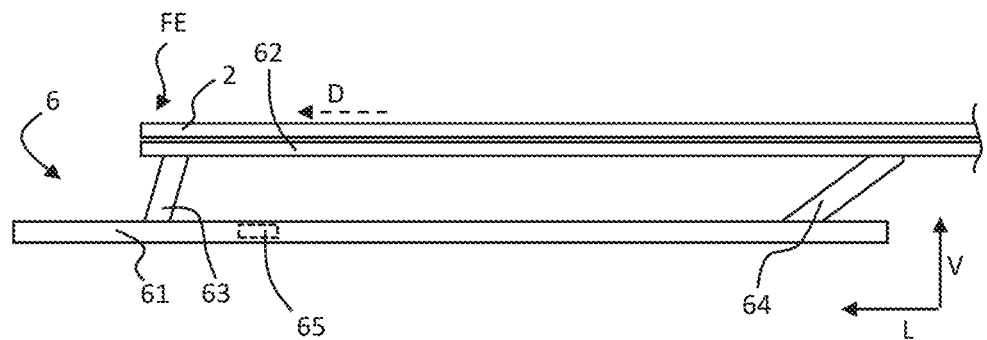

In the first embodiment illustrated in FIGS. 3A-3D, while in the normal operable state, the locking mechanism 65 would be operated simultaneously with the first support mechanism 63 moving forwards in the longitudinal direction in accordance with direction D. In the inoperable state, the locking mechanism 65 remains locked at its locked position, when the first support mechanism 63 is moved forwards in direction D as shown in FIG. 3B. Consequently, the second support mechanism 64 is not operated and remains in its tilted position, i.e. in its raised position (cf. FIG. 2B).

Figure 3C:
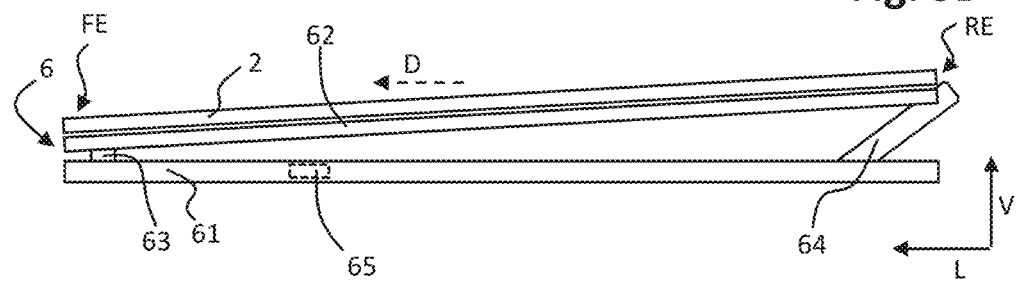

Eventually, sliding forwards in direction D, the closure member 2 and mounting element 62 arrive at their closed position as shown in FIG. 3C. With the second support mechanism 64 still in its tilted position, at the rear end (RE), the mounting element 62 may slide out of its support at the second support mechanism 64.

Figure 3D:
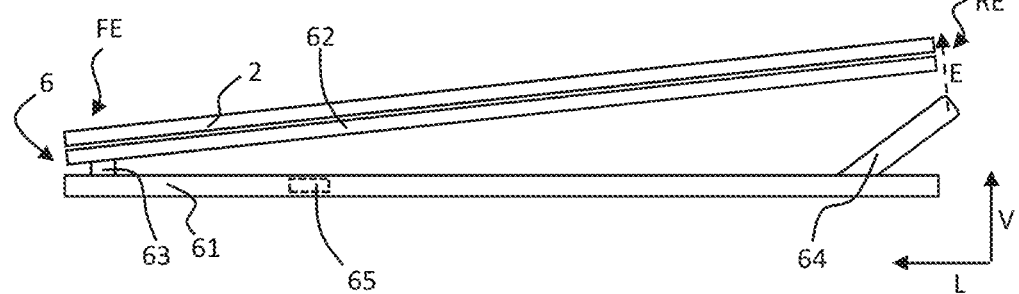
Figure 3E:
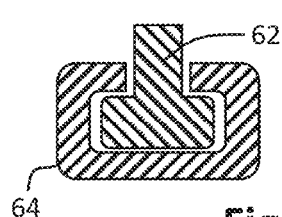

For example, the slideable support may be provided in accordance with the embodiment illustrated in FIG. 3E. In this embodiment, the second support mechanism 64 is provided with a claw substantially enclosing the mounting element 62. The claw may be rotatably arranged to enable the mounting element 62 to slant as shown in FIGS. 2B and 3C. Sliding forward in the direction D, an end of the mounting element 62 may slide out of such claw.

Having slid out of the support of the second support mechanism 64, the mounting element 62 may be lifted in direction E as illustrated in FIG. 3D. Consequently, the rear end (RE) is released and the mounting element in partially unmounted. In a further stage, the mounting element 62 may be released from its support at the first support mechanism 63 or the mounting element 62 and the closure member 2 may be rotated around a rotation axis of the support at the first support mechanism 63, for example. In a particular exemplary embodiment, the first support mechanism 63 may be slid rearwards again, thereby raising the rotation axis, easing the rotation of the closure member 2 and the mounting element 62. Thus, the guide 61 and the second support mechanism 64 are freely accessible for maintenance, e.g. for cleaning or for replacing a part.

Figure 4A:
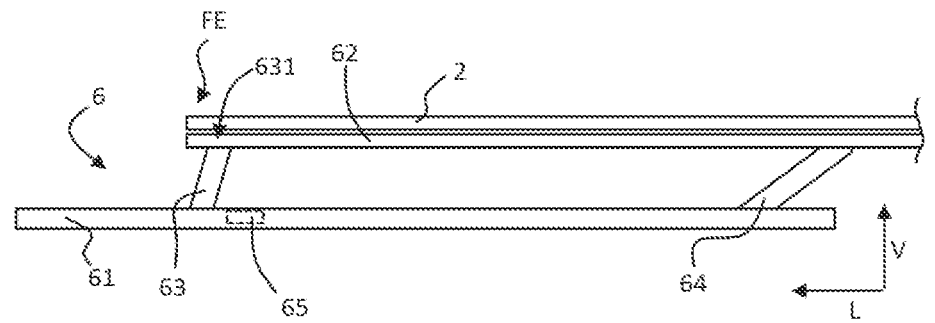
FIG. 4A-4B illustrate a second embodiment of a guide assembly and method according to the present invention.
Figure 4B:
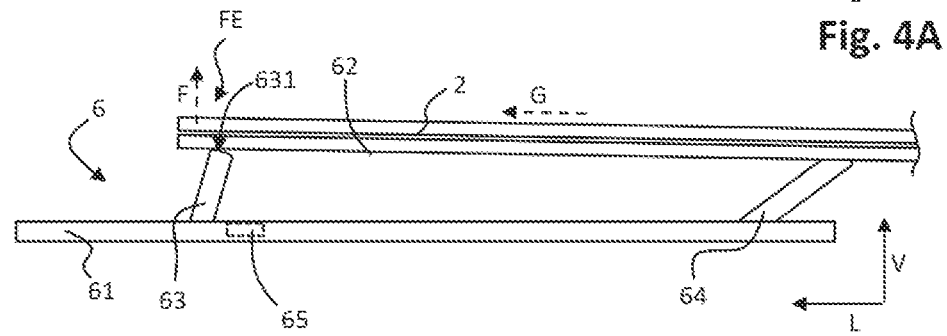

FIGS. 4A and 4B schematically illustrate a second embodiment of the guide assembly 6 and the method according to the present invention. In this embodiment, a release mechanism 631 is provided at the first support mechanism 63. For example, the release mechanism 631 may comprise a pin, which may form an axle of a hinge, for example. The pin may be releasably arranged such that upon removal of the pin, the mounting element 62 is released from the support of the first support mechanism 63.

In the stage as illustrated in FIG. 4A, the first support mechanism 63 has been moved rearwards to a position, where the first support mechanism 63 has raised the front end (FE) of the closure member 2. Thus, the release mechanism 631 may be rendered accessible.

As shown in FIG. 4B, after operating the release mechanism 631, the front end (FE) may be lifted in direction F and/or slid in direction G. Moreover, assuming a slideable support at the second support mechanism 64 as shown in FIG. 3E, for example, the rear end (RE) may be released from the second support mechanism 64 by sliding the closure member 2 and the mounting element 62 in the direction G until the mounting element 62 is released from the support at the second support mechanism 64.

Figure 5A:
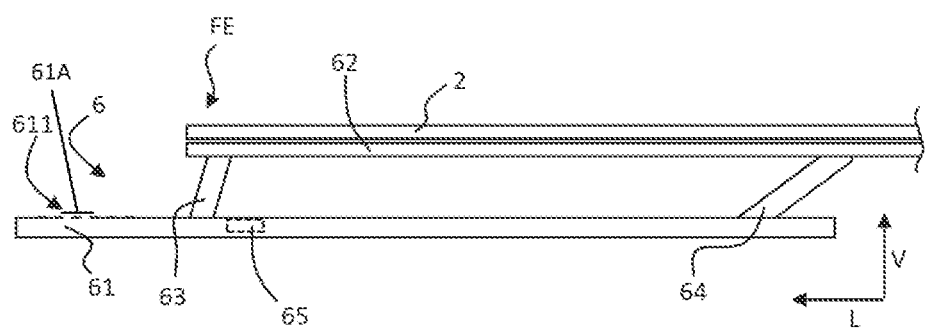
FIG. 5A-5B illustrate a third embodiment of a guide assembly and method according to the present invention.
Figure 5B:
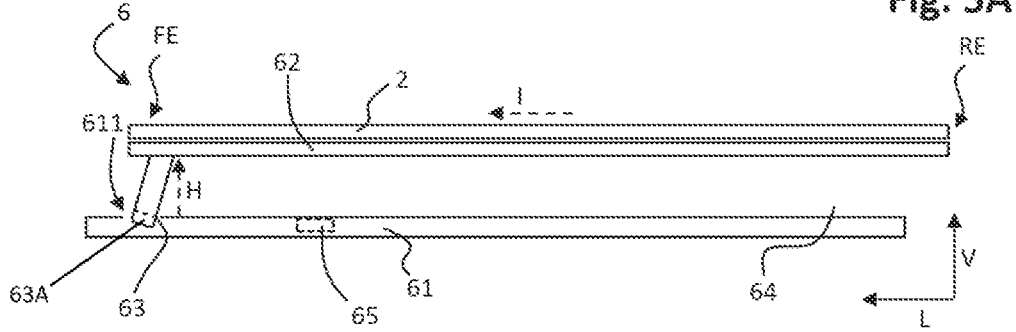
Figure 6C:
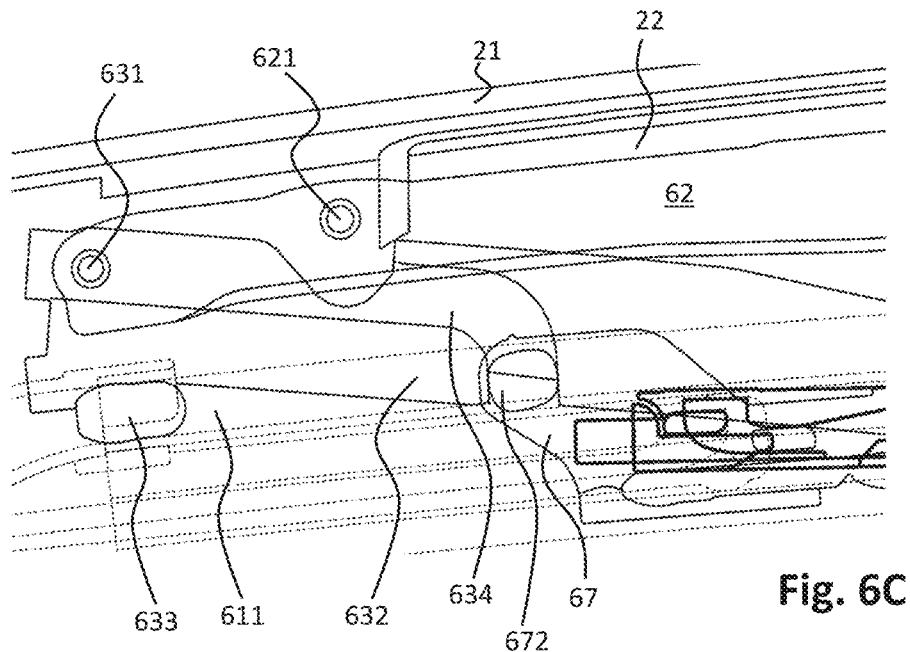
FIG. 6C shows an enlarged view of a first support mechanism of the embodiment of FIG. 6A.
Figure 6D:
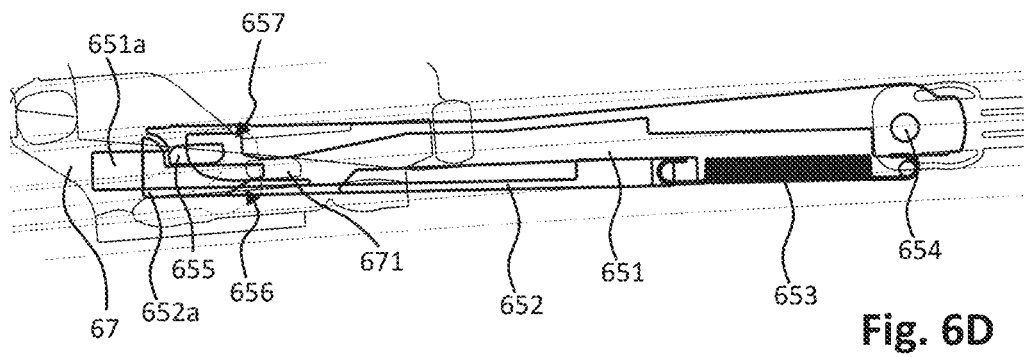
FIG. 6D shows an enlarged view of a locking mechanism of the embodiment of FIG. 6A.
Figure 6E:
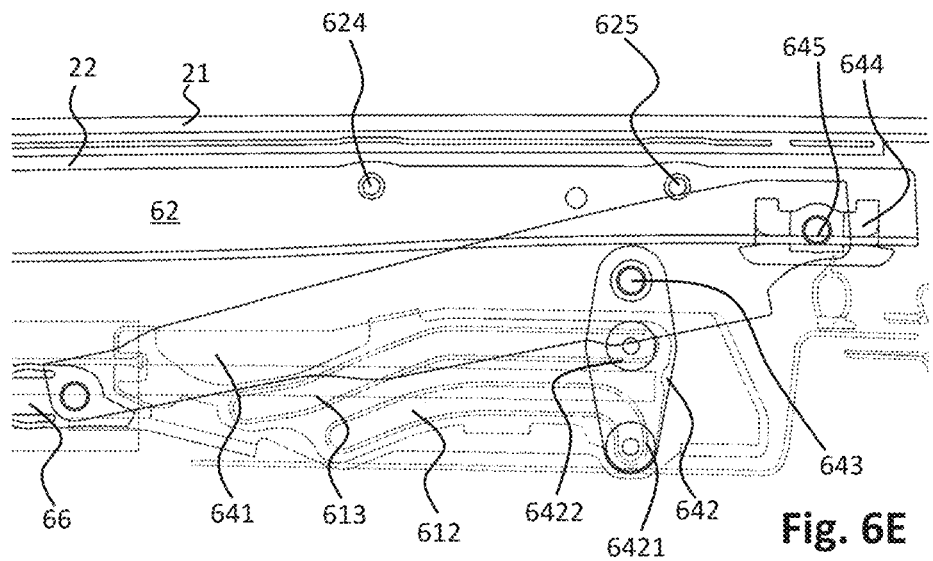
FIG. 6E shows an enlarged view of a second support mechanism of the embodiment of FIG. 6A.

FIGS. 5A and 5B illustrate a third embodiment, in which the first support mechanism 63 is releasable from the guide 61. Referring to FIG. 5A, the guide 61 is provided with a release mechanism, which provide a release opening 611 in the guide 61. The release mechanism may further provide a blocking element 61A (such as a detachable portion of the guide 61) for closing the release opening in normal operation, as apparent to those skilled in the art. In particular, the first support mechanism 63 may be slid rearwards, as shown. Then, the release opening 611 may be opened. Then, as shown in FIG. 5B, the first support mechanism 63 may be slid forward again such that a slide shoe 63A arranged at the first support mechanism 63 and guided in a corresponding guide channel in the guide 61 may be released from said guide channel by lifting the first support mechanism 63 in direction H. Then, similarly to the second embodiment, the closure member 2 and the mounting element 62 may be slid in the direction I, for example in order to release the rear end (RE) from the support at the second support mechanism 64.

It is noted that in the second and third embodiment, the mounting element 62 may be releasable from the support at the second support mechanism 64, but this is not required within the scope of the present invention. As described in relation to the first embodiment, the closure member 2 and the mounting element 62 may remain supported at one of the first support mechanism 63 and the second support mechanism 64, while released from the other one. In such partially released state, the closure member 2 and the mounting element 62 may be rotated around an axis of rotation at the mechanism where they are still supported, for example. In another example, in particular in the second and third embodiments, the closure member 2 and the mounting element 62 may be slid rearwards through the slideable support at the second support mechanism 64 after having been released from the first support mechanism 63 (second embodiment) or from the guide (third embodiment).

Referring to FIGS. 6A-6E and FIGS. 9A-9B, a practical embodiment of the first embodiment (cf. FIGS. 3A-3E) of the guide assembly according to the present invention is illustrated. For sake of clarity, the guide 61 is shown in thin dotted lines and, in the exploded view of FIGS. 9A and 9B, the guide 61 is omitted except for a first guide element 61a and a second guide element 61b, together defining a curved part of a guide channel 611. The first guide element 61a further provides a guiding channel 61a1 and a locking feature 61a2 for cooperating with the locking mechanism 65.

The guide assembly comprises the guide 61 extending in the longitudinal direction and the mounting element 62. The closure member 2, mounted on the mounting element 62, comprises in this illustrated embodiment a glass panel 21 and a glass bracket 22. The glass bracket 22 may be adhered to the glass panel 21 by use of a suitable adhesive, for example. The glass bracket 22 is coupled to the mounting element 62 at a number of mounting positions. In this embodiment, five mounting positions 621-625 are provided. In another embodiment, the number of mounting positions may be different and/or the locations of the mounting positions 621-625 may be different. The mounting element 62 may, for example, comprise threaded through holes at the mounting positions 621-625. Using a suitable screw, the glass bracket 22 may be coupled to the mounting element 62. For adjustment of the closure member 2 to a vehicle body, mounting holes in the glass bracket 22 may be oversized relative to a diameter of the screw, as well known in the art.

The guide assembly further comprises the first support mechanism 63, the locking mechanism 65 and the second support mechanism 64. The first support mechanism 63 is arranged close to the front end (FE), while the second support mechanism 64 is arranged close to the rear end (RE). The locking mechanism 65 and the second support mechanism 64 are coupled through a coupling element 66. An operating slider 67 is slideably arranged in the guide 61. The operating slider 67 may be coupled to a drive cable (not shown) that is arranged in the longitudinal direction. Such a drive cable may be further coupled to a motor such that the motor may be used to move the operating slider 67 in the longitudinal direction along the guide 61. The operating slider 67 is designed, configured and arranged to operate the first support mechanism 63, the second support mechanism 64 and the locking mechanism 65 when moved in the longitudinal direction, as well known in the art.

Referring in particular to FIGS. 6A, 6B and 6C and FIGS. 9A and 9B, the release mechanism may comprise a coupling axel 631 providing a hinging coupling between the first support mechanism 63 and the mounting element 62. A first lever 632 extends from the coupling axel 631 to the guide 61. A slide shoe 633 extends from the first lever 632 in the width direction in a guide channel 611 in the guide 61. The first lever 632 comprises a guide curve 634 having arranged therein a drive cam 672, which protrudes in the width direction from the operating slider 67.

Referring in particular to FIGS. 6A, 6B and 6D and FIGS. 9A and 9B, the locking mechanism 65 a main locking part 651 and an auxiliary locking part 652. The auxiliary locking part 652 is slidably arranged on the main locking part 651 and spring biased by spring 653 towards the coupling element 66. The main locking part 651 comprises a guide pin 651a and the auxiliary locking part 652 comprises a guide hole 652a arranged over the guide pin 651a allowing the auxiliary locking part 652 to only slide in the longitudinal direction relative to the main locking part 651. The main locking part 651 comprises a coupling protrusion 654, for hingeably coupling to the coupling element 66, and a guide protrusion 655 extending in the width direction in a suitable guide channel in the guide 61. The auxiliary locking part 652 comprises a locking surface 656 for engaging with a locking protrusion extending from the guide 61. A locking cam 671 extending from the operating slider 67 is arranged to slide through an operating curve 657 in the main locking part 651. By moving through the operating curve 657 the operating cam 671 can engage the auxiliary locking part 652 and move the auxiliary locking part 652 relative to the main locking part 651 against the spring force of the spring 653. For a detailed description of the locking operation of the locking mechanism 65, reference is made to the co-pending patent application with application number U.S. Ser. No. 16/401, 432, filed May 2, 2019 and published as US2019/0337368, which corresponds to EPO application EP19170198, filed Apr. 4, 2019 and published as EP3564054, both of which are incorporated herein by reference. For the avoidance of doubt, it is noted that in the embodiment of the locking mechanism as shown and described in these co-pending applications, the locking mechanism and guide are designed such that the locking mechanism is not accessible for manual unlocking operation as described herein. Minor adaptations to dimensions of flanges and other parts have made the locking mechanism manually operable from its locked state as described hereinbelow with reference to FIGS. 7A-7D.

Referring in particular to FIGS. 6A, 6B and 6E and FIGS. 9A and 9B, the second support mechanism 64 comprises a second lever 641 extending from the guide 61 to a first support hinge 645 supporting a slide support element 644, e.g. a claw as shown in FIG. 3E, for supporting the mounting element 62. The second lever 641 is supported by a third lever 642 by a second support hinge 643. The third lever 642 is provided with a guide cams 6421 and 6422 arranged in respective guide curves 612 and 613. The second lever 641 is at its end at the guide 61 coupled to the coupling element 66 such that when the locking mechanism 65 is moved by the operating slider 67 the second lever 641 is pulled or pushed. The coupling to the third lever 642 determines the actual trajectory of the second lever 641 when pulled or pushed by the coupling element 66. In this embodiment, the second lever 641, in an open position of the open-roof assembly, extends in the longitudinal, rearward direction beyond the guide 61 and even over a seal of the body of the vehicle as apparent from e.g. FIGS. 6A and 6E.

Figure 7A:
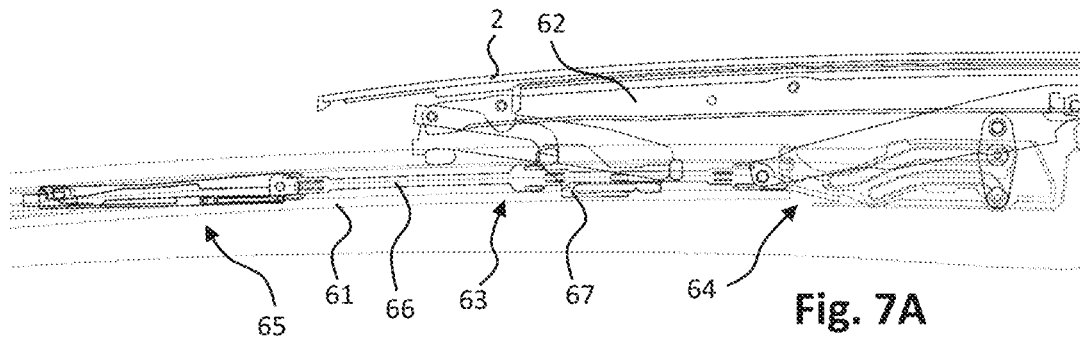
FIG. 7A-7B illustrate a first step in a first embodiment of the method according to the present invention.

FIG. 7A illustrates a first step of a method according to the present invention for releasing the mounting element 62 from at least one of the first and the second support mechanisms 63, 64 such to enable to move the closure member 2 to a position wherein easy access to the guide assembly is provided. In this first step, the operating slider 67 has been moved towards the second support mechanism 64, thereby taking the first support mechanism 63 and the locking mechanism 65 rearward. At a predetermined position along the guide 61, the locking mechanism 65 locks to the guide 61 and is released from the engagement with the operating cam 671 of the operating slider 67. Such operation is as such known from the above-referred co-pending applications and is therefore not elucidated in further detail herein. In FIG. 7A, the locking mechanism 65 is indeed disengaged from the operating slider 67 and is locked to the guide 61, while the operating slider 67 and the first support mechanism 63 have moved further towards the second support mechanism 64, whereby the locking mechanism 65 has become accessible (see also FIG. 6B), since the closure member 2 does no longer cover the locking mechanism 65.

Figure 7B:
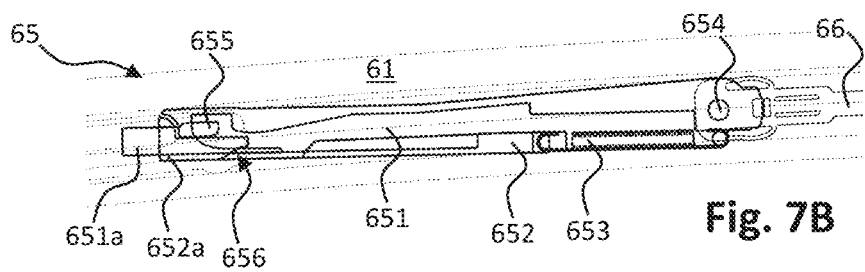
Figure 7C:
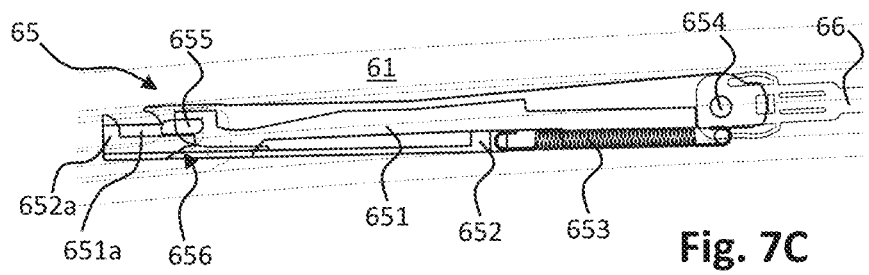
FIG. 7C illustrates a second step in the first embodiment of the method according to the present invention.

The locking mechanism 65 as arranged in the guide 61 in the status of FIG. 7A is shown in more detail in FIG. 7B. In particular, the spring 653 has pulled the auxiliary locking part 652 rearward for locking the locking mechanism 65 to the guide 61. So, in a second step as illustrated in FIG. 7C, the auxiliary locking part 652 is manually operated as a part of a release mechanism and pulled relative to the main locking part 651. Thus, the locking mechanism 65 becomes releasable from its locked position and may thus be rendered temporarily inoperable. Depending on the particular method of locking to the guide 61, some manually operated movements of the locking mechanism 65 may be required to actually release the locking mechanism 65 from the guide 61.

Figure 7D:
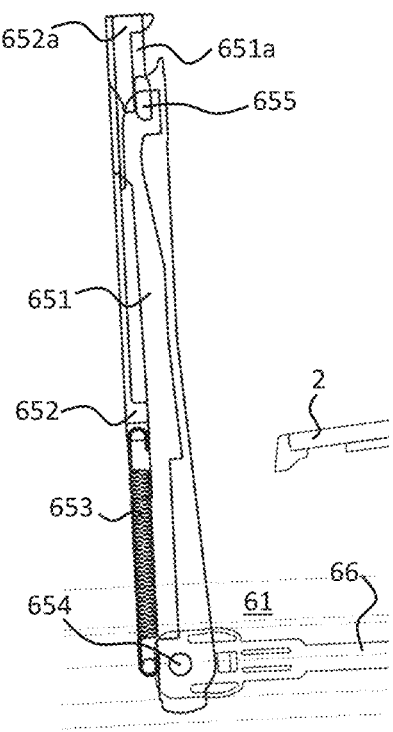
FIG. 7D illustrates a third step in the first embodiment of the method according to the present invention.

In a third step of the method, which is illustrated in FIG. 7D, the locking mechanism 65 is rotated around its coupling protrusion 654. Only after rotation, the locking mechanism 65 may be temporarily released from its coupling to the coupling element 66 by disengaging the coupling protrusion 654 from the coupling element 66.

After removing the locking mechanism 65, the operating slider 67, with the first support mechanism 63, may be moved forward without moving the coupling element 66, thereby leaving the second support mechanism 64 in its open position. Such a movement results in the situation as shown in FIGS. 8A-8C.

Figure 8A:
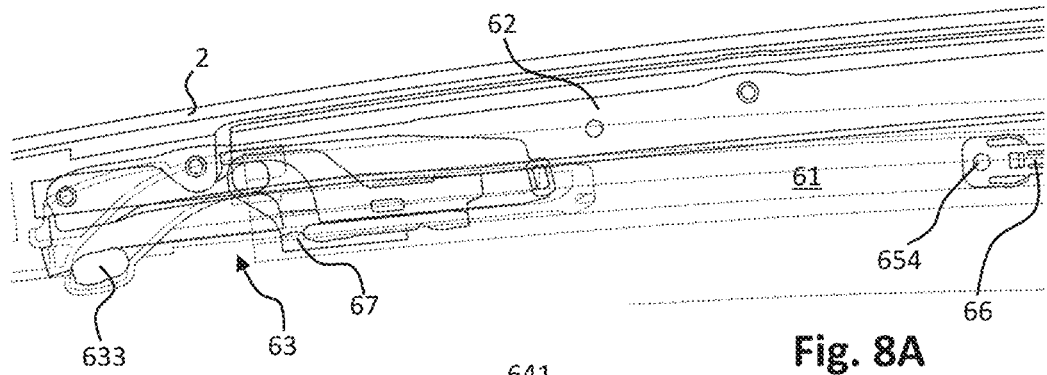
FIG. 8A illustrates a result of the first embodiment of the method according to the present invention.

As shown in FIG. 8A, the first support mechanism 63 is moved to its closed position, wherein the closure member 2 is lowered into a plane of the vehicle roof. The coupling element 66 is disengaged as the locking mechanism 65 is missing.

It is noted that depending on the embodiment of the guide assembly, it may not be necessary to move the first support mechanism 63 completely to its closed position.

Figure 8B:
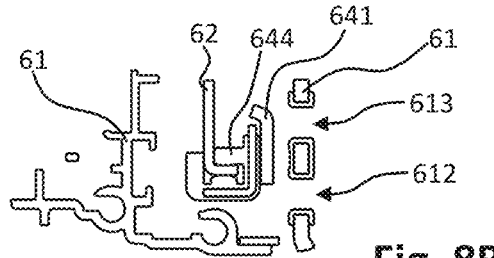
FIG. 8B illustrates a detailed cross-section of the second support mechanism of the embodiment of FIG. 6A.
Figure 8C:
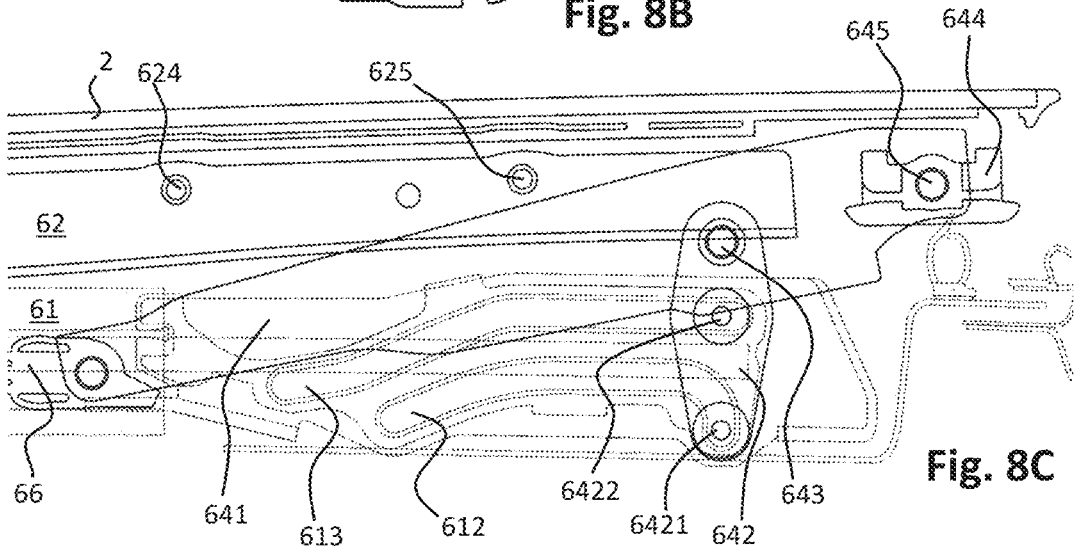
FIG. 8C illustrates the result the first embodiment of the method according to the present invention.

In this embodiment, as illustrated in the cross-section of FIG. 8B, the cross-section taken through the second support mechanism 64 in a closed position, the mounting element 62 is slideable in a claw-like slide support element 644, which is coupled to the second lever 641. Having the second support mechanism 64 in its open position and sliding the first support mechanism 63 to its closed position results in the mounting element 62 sliding out of the claw-like slide support element 644, which is shown in FIG. 8C. Once the mounting element 62 is released from the slide support element 644, the closure member 2 may be tilted and rotated around the coupling axel 631 or a defective element of the second support mechanism 64 may be replaced, for example, without decoupling the glass bracket 22 from the mounting element 62. Thus, the adjusted position of the glass panel 21 is maintained and there is no need to re-adjust the glass panel 21, when the mounting element 62 is re-mounted.

Figure 8D:
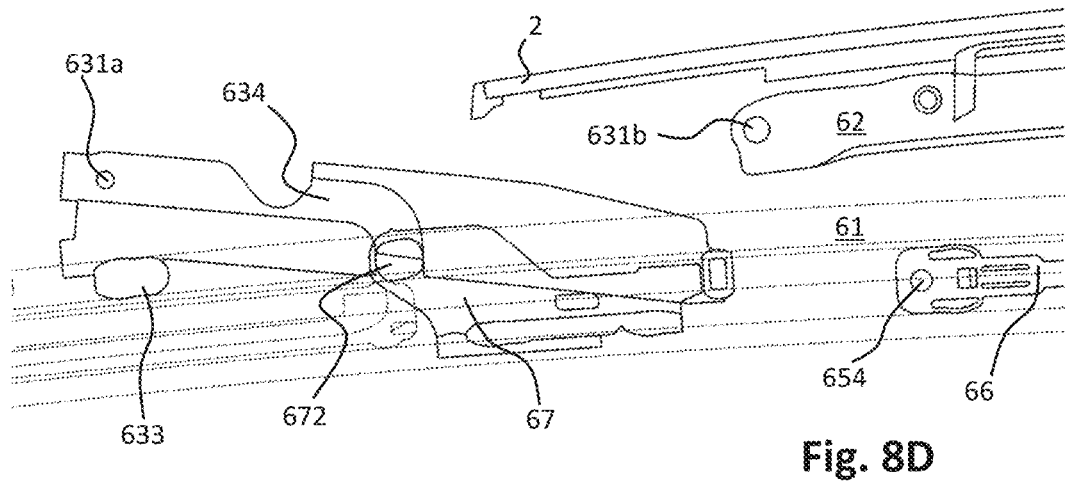
FIG. 8D illustrates a result of a second embodiment of the method according to the present invention.
Figure 9A:
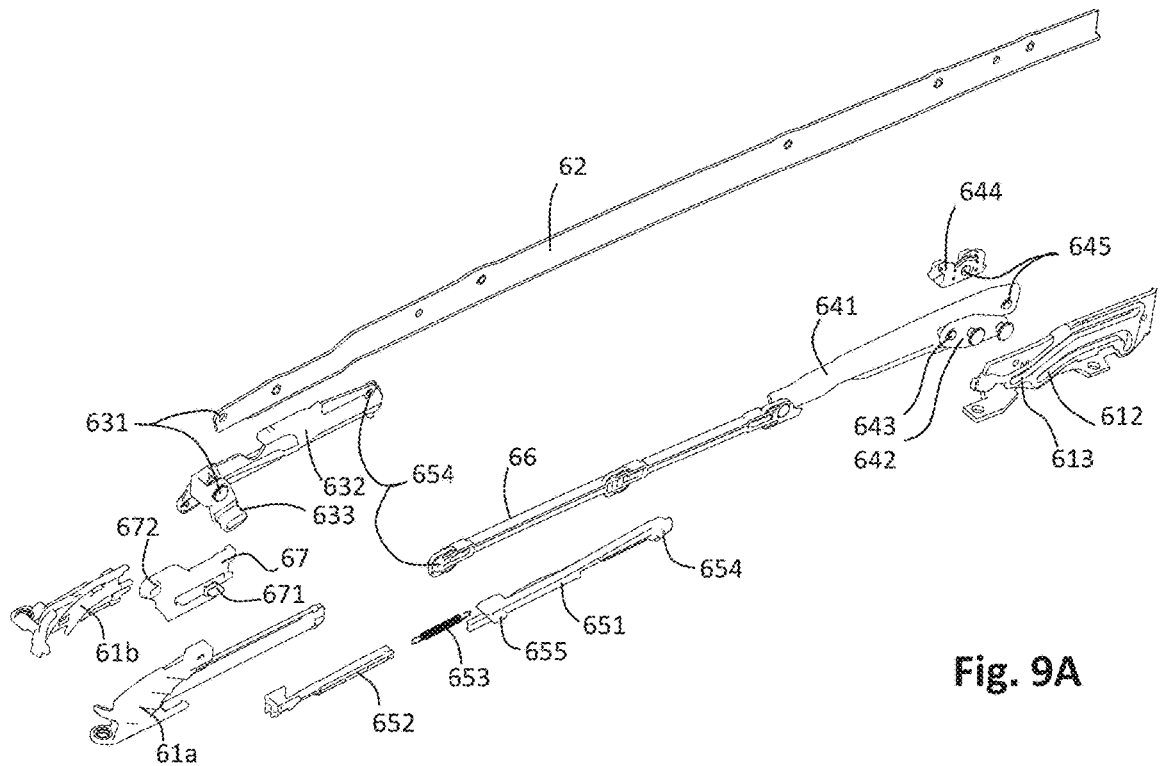
FIG. 9A illustrates an exploded view of the embodiment of FIGS. 6A-6E as seen from a first side.
Figure 9B:
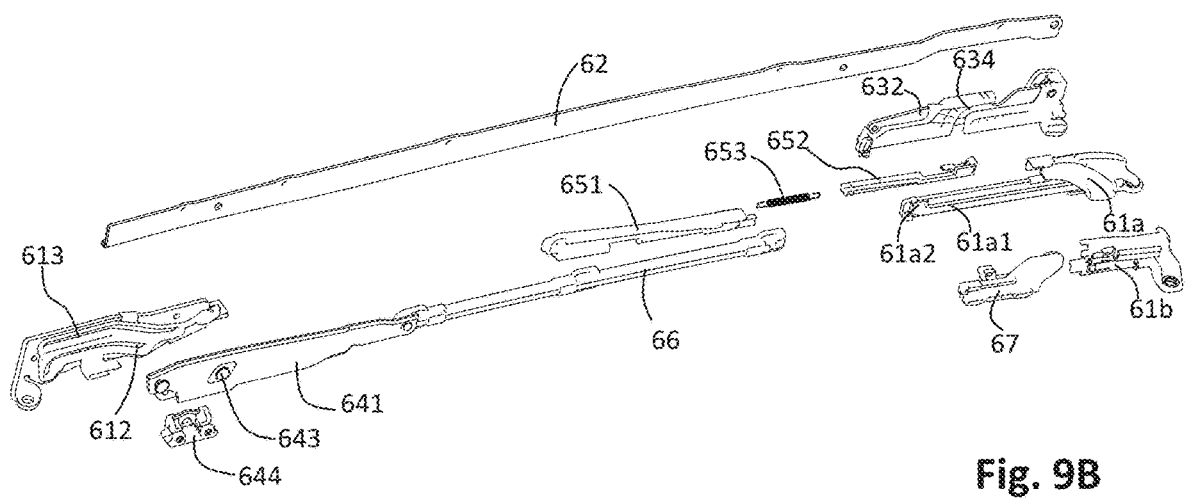
FIG. 9B illustrates an exploded view of the embodiment of of FIG. 9A as seen from a second side opposite from the first side.

FIG. 8D illustrated another embodiment, wherein the coupling axel 631 is removed, thereby releasing the mounting element 62 from the first support mechanism 63. This may be performed in addition to or instead of the release from the second support mechanism 64 as illustrated in FIGS. 8A-8C. Moreover, it is noted that such release of the mounting element 62 from the first support mechanism 63 may not require that the locking mechanism 65 is first removed for decoupling the first support mechanism 63 and the second support mechanism 64, depending on the particular embodiment of the respective support mechanism 63, 64 and other parts of the guide assembly.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A guide assembly for a moveably arranged closure member of an open-roof system of a vehicle, the closure member having a closed position, in which the closure member covers an opening in a roof of the vehicle, and an open position, in which the opening is at least partly uncovered, the guide assembly comprising:
a guide extending in a longitudinal direction of the vehicle;
a mounting element for mounting the closure member;
a first support mechanism operatively coupled to the mounting element, wherein the first support mechanism slidably supports the mounting element in the guide;
a second support mechanism coupled to the guide and comprising a support element supporting the mounting element slidably along the mounting element, the second support mechanism being configured for moving the mounting element in a tilt direction to a tilted position, the tilt direction being substantially perpendicular to the longitudinal direction; and
a release mechanism configured to release the mounting element from at least one of the first support mechanism and the second support mechanism and to remount the mounting element.

2. The guide assembly according to claim 1, and further comprising:
a locking mechanism arranged in the guide and operatively coupled to the second support mechanism for operating the second support mechanism and locking the second support mechanism in the tilted position, wherein the guide assembly is configured to operate the locking mechanism when moving the first support mechanism between the closed position and an intermediate position, the opening being partly covered by the closure member in the intermediate position.

3. The guide assembly according to claim 2 wherein the release mechanism is configured for rendering the locking mechanism temporarily inoperable for enabling to move the first support mechanism towards the closed position without operating the second support mechanism and to thereby slidably release the mounting element from the second support mechanism.

4. The guide assembly according to claim 3, wherein the locking mechanism is decouplable from the second support mechanism.

5. The guide assembly according to claim 4, wherein the locking mechanism is detachably arranged in the guide and the locking mechanism is hingedly coupled to an elongated coupling element, the coupling element being couplable between the locking mechanism and the second support mechanism, and wherein the locking mechanism is decouplable after having been detached from the guide and having been rotated.

6. The guide assembly according to claim 2, and further comprising an operating slider, slidably arranged in the guide, the operating slider comprising a locking cam configured to operate the locking mechanism, wherein the locking cam is displaceable from an operable position to an inoperable position, wherein in the operable position the locking cam is arranged to engage an operating surface of the locking mechanism and in the inoperable position is arranged to not engage the operating surface of the locking mechanism.

7. The guide assembly according to claim 1, wherein the release mechanism is configured to release the first support mechanism from the guide.

8. The guide assembly according to claim 7, wherein in the closed position the first support mechanism is arranged at a frontal end of the guide, a blocking element being provided at the frontal end and configured to hold the first support mechanism.

9. The guide assembly according to claim 8, wherein the blocking element is detachably arranged such that detaching the blocking element allows the first support mechanism to be released from the guide.

10. The guide assembly according to claim 7, wherein the first support mechanism comprises a slide shoe arranged in a guide channel of the guide and wherein a release part of the guide is detachable to provide a release opening in the guide channel, the release opening being configured to allow release of the slide shoe from the guide channel.

11. A method for maintenance of a guide assembly for a moveably arranged closure member of an open-roof system of a vehicle, the closure member having a closed position, in which the closure member covers an opening in a roof of the vehicle, and an open position, in which the opening is at least partly uncovered, wherein the closure member is adjustably mountable to a mounting element and the closure member has been adjusted and secured to the mounting member so as to obtain a desired position of the closure member relative to the fixed roof, the guide assembly comprising a first support mechanism, a second support mechanism and a guide extending in a longitudinal direction of the vehicle, both said first and second support mechanisms supporting a mounting element, the mounting element being configured for mounting the closure member, the method comprising:
moving the closure member to the open position;
releasing the mounting element from at least one of the first support mechanism and/or the second support mechanism; and
remounting the mounting element at said at least one of the first support mechanism and/or the second support mechanism wherein the closure member returns to the desired position relative to the fixed roof without performing readjustment of the closure member on the mounting element.

12. The method for maintenance of a guide assembly according to claim 11, wherein the guide assembly comprises a locking mechanism for locking the second support mechanism in a tilted position, wherein moving the closure member to the open position comprises moving the closure member from the closed position to the open position at least to an extent that the second support mechanism is locked in the tilted position, and wherein the method further comprises rendering the locking mechanism temporarily inoperable and wherein releasing the mounting element from at least one of the first support mechanism and/or the second support mechanism comprises moving the closure member towards the closed position, thereby releasing the mounting element from the second support mechanism.

13. The method according to claim 12, wherein rendering the locking mechanism temporarily inoperable comprises:
detaching the locking mechanism from the guide;
rotating the locking mechanism; and
decoupling the locking mechanism from the second support mechanism.

14. The method according to claim 11, and further comprising releasing the first support mechanism from the guide.

15. An open-roof system for a vehicle having an opening in a fixed roof, the open-roof system comprising:
a closure member of size to close the roof opening;
a guide assembly configured to move the closure member from a closed position closing the roof opening wherein the closure member is in a desired position relative to the fixed roof to an open position in which the opening is at least partly uncovered, the guide assembly comprising:
a guide extending in a longitudinal direction of the vehicle;
a mounting element configured to be adjustably mounted to the closure member such that the closure member is in the desired position;
a first support mechanism operatively coupled to the mounting element, wherein the first support mechanism slidably supports the mounting element in the guide;
a second support mechanism coupled to the guide and comprising a support element supporting the mounting element slidably linearly relative to the support element, the second support mechanism being configured for moving the mounting element in a tilt direction to a tilted position, the tilt direction being substantially perpendicular to the longitudinal direction; and
a release mechanism configured to release the mounting element from at least one of the first support mechanism and the second support mechanism and to remount the mounting element wherein the closure member returns to the desired position relative to the fixed roof without performing readjustment of the closure member on the mounting element.

16. The open-roof system according to claim 15, and further comprising:
a locking mechanism arranged in the guide and operatively coupled to the second support mechanism for operating the second support mechanism and locking the second support mechanism in the tilted position, wherein the guide assembly is configured to operate the locking mechanism when moving the first support mechanism between the closed position and an intermediate position, the opening being partly covered by the closure member in the intermediate position.

17. The open-roof system according to claim 16 wherein the release mechanism is configured for rendering the locking mechanism temporarily inoperable for enabling to move the first support mechanism towards the closed position without operating the second support mechanism and to thereby slidably release the mounting element from the second support mechanism.

18. The open-roof system according to claim 17, wherein the locking mechanism is decouplable from the second support mechanism.

19. The open-roof system according to claim 18, wherein the locking mechanism is detachably arranged in the guide and the locking mechanism is hingedly coupled to an elongated coupling element, the coupling element being couplable between the locking mechanism and the second support mechanism, and wherein the locking mechanism is decouplable after having been detached from the guide and having been rotated.

20. The open-roof system according to claim 16, and further comprising an operating slider, slidably arranged in the guide, the operating slider comprising a locking cam configured to operate the locking mechanism, wherein the locking cam is displaceable from an operable position to an inoperable position, wherein in the operable position the locking cam is arranged to engage an operating surface of the locking mechanism and in the inoperable position is arranged to not engage the operating surface of the locking mechanism.

* * * * *